United States Patent [19]

Yan

[11] Patent Number: 5,112,494
[45] Date of Patent: May 12, 1992

[54] REMOVAL OF CYANIDE FROM WATER

[75] Inventor: Tsoung Y. Yan, Philadelphia, Pa.

[73] Assignee: Mobil Oil Corporation, Fairfax, Va.

[21] Appl. No.: 754,087

[22] Filed: Sep. 3, 1991

[51] Int. Cl.$^5$ ............................. C02F 1/28; C02F 1/74
[52] U.S. Cl. .................................... 210/668; 210/673; 210/679; 210/758; 210/904
[58] Field of Search ............... 210/668, 673, 679, 758, 210/904

[56] References Cited

U.S. PATENT DOCUMENTS

| | | | |
|---|---|---|---|
| 2,194,438 | 3/1940 | Wernlund et al. | 210/904 |
| 3,650,949 | 3/1972 | Hager et al. | 210/36 |
| 4,909,926 | 3/1990 | Yan | 208/253 |

Primary Examiner—Ivars Cintins
Attorney, Agent, or Firm—Alexander J. McKillop; Charles J. Speciale; Jessica M. Sinnott

[57] ABSTRACT

Cyanide is removed from a cyanide-containing waste water by passing the water through an adsorbent porous solid substrate which has been treated with a water insoluble metal compound, preferably copper sulfide (CuS), that facilitates adsorption of the cyanide, a preferred adsorbent substrate is activated carbon. An oxidizing agent is supplied to the adsorbent to oxidize the adsorbed cyanide, the preferred oxidizing agent is a source of oxygen such as air. Ammonia is passed over the bed along with the waste water to enhance the longevity of the adsorbent.

20 Claims, 3 Drawing Sheets

REMOVAL OF CYANIDE FROM WATER

FIELD OF THE INVENTION

The invention is directed to the removal of cyanide from waste water using an adsorbent substrate treated with a water insoluble compound.

BACKGROUND OF THE INVENTION

Although cyanides themselves are useful industrial materials, as a component of waste water certain forms of cyanide are undesirable, having been found to be offensive to the aquatic environment. Examples of the undesirable forms of cyanides are HCN and $CN^-$. As an environmentally protective measure, the Environmental Protection Agency (EPA) has placed strict limits on the allowable cyanide levels of industrial waste water effluent streams. Industrial sources of undesirable forms of cyanide are waste waters from the coal, the natural gas and the electroplating industries. Refinery waste waters, mainly from the FCC and coking processes, also require treatment to remove cyanides.

Various approaches to removing cyanides have been described. A process which utilizes hydrogen peroxide for the destruction of cyanide in waste water has been found to meet the cyanide effluent limits. However, the process requires continuous addition of hydrogen peroxide which is costly. Additionally, storage and handling of the hydrogen peroxide requires extensive procedures and equipment. Hydrogen peroxide decomposes readily and special care must be taken to avoid contamination of the storage vessel which could catalytically accelerate decomposition. Furthermore, because decomposition releases oxygen, which is explosive under pressure, the vessel must be carefully monitored to keep the oxygen level low.

Another water treatment method to remove cyanide is chlorination which converts cyanide to the essentially nontoxic cyanate. Chlorination processes typically use chlorine gas or hypochlorite. The disadvantage of chlorination is the cost associated with continuously supplying the source of chlorine to the waste stream which competes with other processes that utilize chlorine. Moreover, the chlorine requirements depend on the cyanide level in the water necessitating close monitoring to make adjustments in the chlorine concentration. Furthermore, the process, requiring refrigeration when recycling the HCN stripper bottoms back to the absorber for the most efficient waste volume reduction, increases the amount of energy and process equipment requirements.

One additional method for treating cyanides in waste water, particularly cyanides found in the effluent from the FCC and coking units, involves injecting sulfur-containing compounds such as polysulfides into the cyanide containing water. The polysulfides convert the cyanide to thiocyanate which can be stripped from the waste water. A disadvantage of this process, however, is the difficulty in meeting the low conversion requirements of the EPA specifications.

U. S. Pat. No. 3,650,949 teaches a method of removing cyanide from waste water by maintaining in the water high levels of cupric ion and oxygen and passing the water containing the cyanide, cupric ion and oxygen into a bed of activated carbon. The source of cupric ion is a copper salt which is water soluble. The copper ion must be continuously added to the process stream to maintain the level of copper necessary to remove the cyanide. The patent teaches that a bed of activated carbon can be pre-impregnated with cupric ion; however, the water solubility of the cupric ion imparts serious economic disadvantages to the process. The copper will leach out of the bed leaving a residue in the treated stream requiring another treatment step to remove the residual copper. Also, leaching out of the copper requires re-impregnating the carbon bed. The major disadvantage of having to re-impregnate the bed includes the nonproductive time spent replacing the copper and the chemicals and equipment required.

In developing water treatment processes particular concern is directed to processes which do not leave residues in the treated stream. Residues can cause additional disposal problems. Materials consumption and cost is also an important factor; thus, it is important to avoid processes which require replenishing the supply of costly catalyst and reagent.

SUMMARY OF THE INVENTION

A waste water treatment method has now been discovered in which cyanide-containing waste water is passed over an adsorbent substrate treated with a water insoluble compound.

DETAILED DESCRIPTION OF THE INVENTION

Figure 1A:
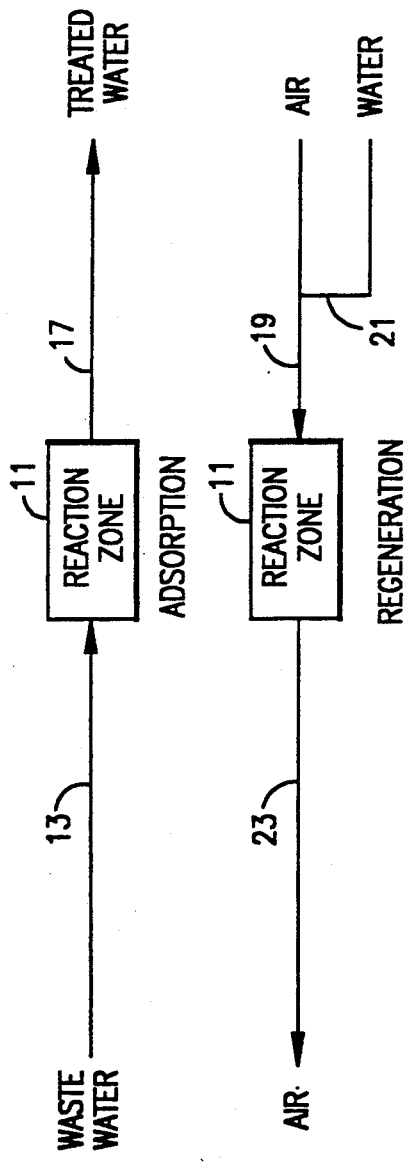
FIG. 1A is a simplified schematic diagram of the cyclic process in accordance with the invention.

The invention is a process for removing cyanide from waste water by passing the waste water through an adsorbent substrate treated with a water insoluble compound. The process eliminates waste water-containing cyanides to the extent undetectable by current analytical techniques. The process is economically advantageous because it employs a long lasting adsorbent which effectively removes cyanide but does not require continuous replacement of the active adsorbent component and the adsorbent is easily regenerated with small amounts of inexpensive readily available materials.

An object of the invention is the removal of cyanides from waste water.

A feature of the invention is the removal of cyanides from waste water utilizing a water insoluble metal compound deposited onto a porous adsorbent substrate.

An advantage of the invention is the reduced cost and improved efficiency in the treatment of a cyanide-containing waste water by employing a porous substrate treated with a water insoluble metal compound which removes cyanides from the water and can be regenerated without replacing the metal.

A further advantage of the invention is that the metal of the water insoluble metal compound has oxidation properties which can facilitate conversion of the adsorbed cyanide into innocuous compounds such as cyanate and nitrogen.

Cyanide can be substantially eliminated from waste water as measured by current analytical techniques by passing the cyanide containing water over a porous substrate treated with a water insoluble metal compound which improves the adsorption and concentration of the cyanide ion on the porous substrate. An oxidizing agent supplied to the substrate converts the cyanide to inoffensive compounds such as cyanate and nitrogen with the aid of the water insoluble metal compound. The adsorption and oxidation is carried out under conditions of atmospheric temperature and pressure which are easily incorporated into current refinery processes.

Adsorbent substrates which are useful include the porous solids. A variety of porous solids can be employed for purposes of the invention. However, representative examples of porous solids include inorganic ion-exchange materials and activated carbon.

Specific examples of the inorganic ion exchange materials include both the naturally occurring materials such as the mineral zeolites including mordenite, clinoptilolite, erionite and sepiolite, clays and synthetic materials, which include $Al_2O_3$, $SiO_2$, $SiO_2/Al_2O_3$, zeolites such as zeolite A, zeolite X, zeolite Y and ZSM-5 and mordenite.

The activated carbon substrate is preferred having a large surface area which allows physical adsorption of the dissolved cyanide. Activated carbon is also a most effective adsorbent for aqueous systems. Activated carbon has an internal pore structure which can be developed through known processing techniques. Activated carbons have a characteristically large specific surface area ranging from 300 to 2500 $m^2/g$. This allows the physical adsorption of dissolved or dispersed substances from liquids or adsorption of gases and vapors from gases. The pore size of the majority of the pores of activated carbon for gas-phase adsorption is less than 3 nm while the size of the majority of pores for liquid-phase adsorption is 3 nm and larger. Most suitably, the carbon is designed for liquid-phase adsorption. Thus, the substrate can be in a powdered or granular form, particle sizes ranging from 1 to 200 mesh size, preferably 4 to 40 mesh size.

A feature of the discovery is that the properties of the adsorbent substrate are improved by depositing a water insoluble compound onto the surface and into the pores of the substrate which improves the longevity and cyanide adsorption efficiency of the substrate. Representative of suitable water insoluble compositions are those water insoluble compounds which contain a metal having oxidation properties, examples of which include Cu, Fe, Ni, Ag, Au, Mo, Co and Zn. The water insoluble sulfide forms of these metals are most preferred, although the water insoluble oxide forms are suitable. Specific examples of water insoluble sulfided compounds include CuS, $Cu_2S$, FeS, ZnS, $MoS_2$, NiS, CoS and AgS. Specific examples of water insoluble oxides include $Cu_2O$, FeO, $Fe_2O_3$, ZnO, CoO, $Co_2O_3$, NiO and $Au_2O_3$. The preferred compounds have a very low solubility-product constant which, for practical purposes renders the compound insoluble in water. For example, CuS has a solubility-product constant of $8.5 \times 10^{-45}$ (at 18° C.). Represented in terms of the solubility of CuS in water; that is, the quantity of CuS that dissolves in a liter of water, CuS is substantially insoluble in water having an extremely low solubility of about $5.9 \times 10^{-21}$ g Cu/l.

A packed bed provides an effective and efficient contactor. In the packed bed the reaction zone proceeds along the direction of flow as the adsorbent becomes exhausted. Exhaustion of the adsorbent is detected by cyanide breakthrough. The bed is easily regenerated by passing hot gases such as steam or flue gas over the bed. It is preferred to include an oxidizing agent in the regeneration gas to convert the adsorbed cyanide to inoffensive materials. Air, readily available, is the preferred oxidizing agent; however, other agents include steam, ozone, $O_2$ and polysulfides. A representation of the mechanism for the process is as follows:

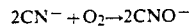

$$2CN^- + O_2 \rightarrow 2CNO^-$$

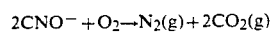

$$2CNO^- + O_2 \rightarrow N_2(g) + 2CO_2(g)$$

The $CNO^{31}$ and $N_2$ which are known to be inoffensive to the environment and can be easily disposed.

The invention is carried out in a cyclic process in the liquid phase incorporating two steps which are adsorption and regeneration. In a preferred embodiment of the cyclic process shown in FIG. 1A, during the adsorption step, waste water is passed to a reaction zone 11 via line 13, the reaction zone 11 contains the CuS treated adsorbent. The water flows at a liquid hourly space velocity (LHSV) ranging from 0.01 to 100, preferably from 0.1 to 10. The rate of flow of the water is attributable to the pressure imposed on the stream by the upstream processing unit. The temperature of the reaction ranges from 40° F. to 400° F. and pressures of 0 to 1000 psig. The cyanide is adsorbed onto the adsorbent and the treated water flows out of the first reaction zone via effluent line 17. Breakthrough of cyanide; that is, detection of cyanide in the treated water flowing from the effluent line 17, indicates that the adsorbent is exhausted. Preferably just prior to breakthrough which, depending upon the cyanide content of the water, occurs after treatment of about 100 to 100,000 bed volume of water, flow of the water is discontinued and the process is switched to the regeneration step by passing the oxidizing agent through line 19 to the adsorbent. The oxidizing agent can be, optionally, mixed with clean water, conveyed through line 21. The regeneration is conducted by passing the oxidizing agent and, optionally, water countercurrently through the reaction zone 11 at a temperature which ranges from 200° to 600° F. and a velocity of 1 to 1000 LHSV and 0 to 100 psig. The oxidized cyanide ion is carried away from the reaction zone in the next pass of waste water or scrubbed from the adsorbent and safely disposed.

Figure 1B:
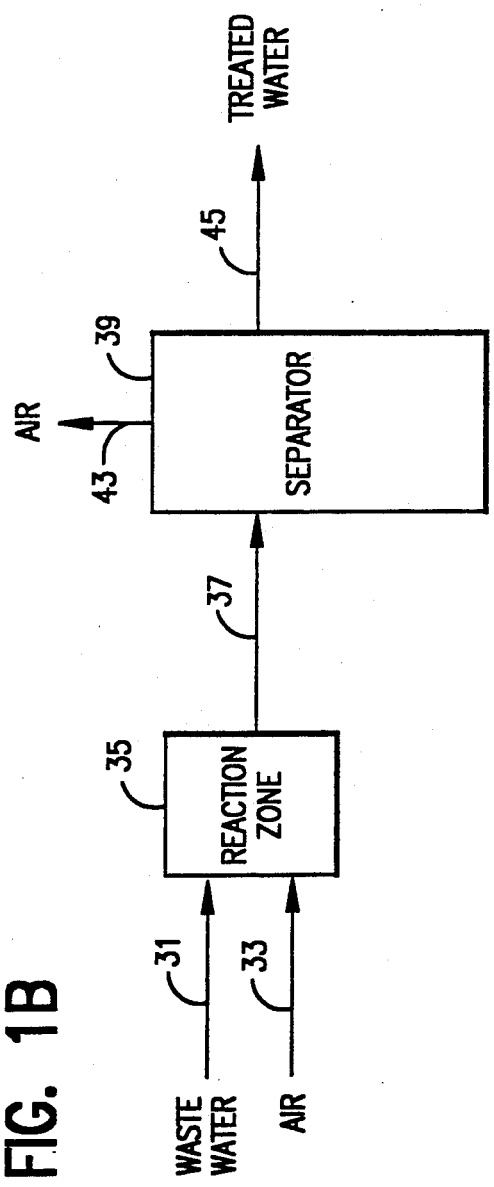
FIG. 1B is a simplified schematic diagram of the continuous process in accordance with the invention.

The process can also be conducted in a continuous contactor in the liquid phase which incorporates both adsorption and regeneration in one step. As shown in FIG. 1B, in the continuous process, the adsorbent bed used in reaction zone 35 is essentially the same as the adsorbent bed used in the reaction zone 11 of FIG. 1A. However, by cofeeding the oxidizing agent during adsorption the bed undergoes regeneration so that the flow of cyanide-containing water does not have to be terminated to regenerate the adsorbent bed. The waste water fed through line 31 and oxidizing agent fed through line 33, preferably air, are conveyed to the fixed bed 35 at a flow rate ranging from 0.01 to 100 LHSV, preferably from 0.1 to 10 LHSV. The amount of oxidizing agent fed along with the water is sufficient to provide 1 to 1000 times, preferably 1 to 100 times the stoichiometric requirement for oxidizing the oxidizable components adsorbed which include cyanide (i.e. the chemical oxygen demand of the water). The reactor 35 is maintained at the temperatures of the wastewater stream, ranging from 35° to 200° F., preferably from 40° to 150° F. and pressures ranging from 0 to 1000 psi, preferably from 0 to 500 psi. The cyanide contained in the water is adsorbed onto the bed and the oxygen passing over the bed at the same time oxidizes the adsorbed cyanide. Thereafter, the treated effluent is discharged through line 37 to separator 39 where the air is separated and vented out through vent 43 and the treated water is discharged via line 45.

The effective water treating properties of the bed are quite long lasting because the metal deposited on the substrate, being in the form of a water insoluble compound, does not have to be replaced. However, as the bed ages the adsorbent properties decrease and the bed must be regenerated. The regeneration method using hot gas containing an oxidizing agent as described above can be employed. In addition, a process for reactivating the adsorbent bed has been discovered which is an additional feature of the invention. The longevity of the adsorbent can be extended by passing ammonia over the bed. Reactivation of the bed by adding ammonia should not be required until just before the first sign of cyanide breakthrough or, depending on the cyanide content of the water, after treatment of 100 to 10,000 bed volume. Adding ammonia reactivates and increases the longevity of the adsorbent without necessitating restoration of the metal compound. The ammonia can be added cocurrently along with the untreated waste water and oxidizing agent. Alternatively, the ammonia can be flushed through the bed countercurrently as in the cyclic process. A concentration of 1 to 100 ppm, preferably 2 to 10 ppm of ammonia effectively regenerates the adsorbent. The ammonia can be conveniently added without altering the operating conditions.

In one embodiment of the invention water insoluble CuS is deposited onto the surface and into the pores of the activated carbon substrate. To make this adsorbent, an activated carbon substrate is impregnated with an aqueous copper nitrate solution. The substrate is dried at temperatures ranging from 100° F. to 700° F., preferably from 300° F. to 500° F., to dry and decompose the copper nitrate to form cupric oxide (CuO). To obtain an active adsorbent the temperature should not exceed 700° F. Preferably, the amount of CuO on the adsorbent ranges from 1% to 30%, preferably from 5% to 20% based on the weight of the treated adsorbent. The CuO on the adsorbent is then sulfided by contacting the bed with a source of sulfur, preferably hydrogen sulfide or elemental or organic sulfur, which has been dissolved in a solvent, preferably, oil, at 100° to 500° F. The adsorbent bed is then exposed to elevated temperatures ranging from 100° to 500° F., preferably 200° to 300° F. to dry the bed. The sulfiding step can be conducted externally, i.e., ex-situ. The sulfiding should be continued until the sulfur content is at least 80% of the stoichiometric amount of the CuO to form the metal sulfide (i.e., CuS). When the sulfiding is performed externally, the finished adsorbent is loaded into the reactor to form the bed.

The waste water should be maintained at a pH of about 6-12; however, it is best if the water is neutral to somewhat alkaline having a pH ranging from 7 to 10.

It is believed that the process is not only beneficial in removing cyanides, but will remove other offensive and undesirable contaminants from the waste water such as mercury. The process also oxidizes other reducing compounds to reduce the chemical oxygen demand (COD) of the wastewater and improve the quality of the wastewater for discharge.

A source of cyanide in waste water which is problematic to refineries is in the effluent from the FCC unit and the coker. For example, the composition of waste water from an FCC unit is shown in Table 1.

TABLE 1

| Composition of FCC Wastewater | |
|---|---|
| Component | Concentration ppm |
| S-- | 3 |
| CN | 10 |

When treating FCC or coker waste water, the process of this invention is best located prior to mixing the FCC and coker waste streams with other refinery waste waters which would dilute the cyanide concentration and increase the volume of water to be treated.

The following examples demonstrate the advantages of the invention in more precise detail.

EXAMPLE 1

Test solutions simulating cyanide containing waste water from an FCC unit are prepared by dissolving NaCN in demineralized water to cyanide levels of 10 and 100 ppm. NaOH is added to the solution to raise the pH to 10 to maintain the cyanide.

Adsorbents 1 and 2 are prepared having the properties described in Table 2.

TABLE 2

| | Properties of Adsorbent | |
|---|---|---|
| | Adsorbent 1 Liquid Phase Copper Sulfide Treated Activated Carbon | Adsorbent 2 Liquid Phase Activated Carbon |
| CuO wt. % | 13.00 | — |
| Active carbon wt. % | 86.00 | 100.00 |
| Sulfur wt. % | 4.32 | — |
| Bulk density, lb/ft$^3$ | 40.00 | 27.50 |
| Surface Area m$^2$/g | 550–800 | 1000–1100 |
| Pore Volume cc/g | 0.2–0.3 | 0.94 |

Adsorbent 1 is prepared by impregnating the active carbon with a $Cu(NO_3)_2$ solution to the required copper level. The mixture is dried at 220° F. for 3 hours. The dried product is heated in air to 500° F. to decompose and convert the $Cu(NO_3)_2$ to CuO. The treated adsorbent is then sulfided by pumping naphtha containing 0.1% sulfur through the bed at 450° F. and 250 psi. Completion of the sulfiding step is determined when $H_2S$ is detected in the effluent.

Adsorbent 2 is a conventional activated carbon adsorbent sold by Calgon under the trademark CAL 12×40.

To prepare the bed, each adsorbent is crushed into 20 to 40 mesh size and 5 cc of each crushed adsorbent is packed into a glass tube of 7 mm diameter.

The CN$^-$ concentration in the water is measured using a cyanide ion specific electrode. The sensitivity of the electrode is 0.01 ppm of CN$^-$.

EXAMPLE 2

A test water solution containing 10 ppm cyanide is passed downwards through the packed bed of activated carbon adsorbent at a flow rate of 5 LHSV, i.e., 25 cc per hour. The conditions of reaction included a temperature of 23° C. and a pressure of 100 psi. At incremental bed volumes of treatment the effluent is collected and analyzed for cyanide content. Breakthrough of the cyanide occurs after about 7 bed volume. The data collected are plotted in a graph of bed volume v. ppm cyanide, see FIG. 2.

EXAMPLE 3

The test water solution containing 10 ppm of $CN^-$ is passed downwards through the packed bed of adsorbent 1 of Example 1, the activated carbon treated with CuS. The conditions of reaction were similar to the conditions described in Example 2. The cyanide level of the treated effluent are measured at specified volumes of water treatment. At 10 ppm cyanide concentration, the water insoluble CuS treated carbon adsorbent effectively removed cyanide from the water even after 80 bed volume. The data collected are plotted in a graph of bed volume v. ppm cyanide, see FIG. 2.

EXAMPLE 4

In a more rigorous test, a test water solution containing 100 ppm cyanide is passed over the CuS treated activated carbon adsorbent. The conditions of reaction include a temperature of 23° C. and a pressure of 100 psi. Cyanide breaks through after treatment of 35 bed volume.

EXAMPLE 5

In the test described in Example 4, after 35 bed volume, air is cofed countercurrent to the test solution at a rate of 240 cc air/cc $H_2O$ to oxidize the adsorbed cyanide. After 15 bed volume of water and air passes through the bed, the liquid product is analyzed for $CN^-$ concentration and no cyanide is detected. The air and water continue to pass through the adsorbent and even after 135 bed volume of water no cyanide is detected in the treated water. This indicates that the adsorbed cyanide is readily oxidized with air.

Figure 2:
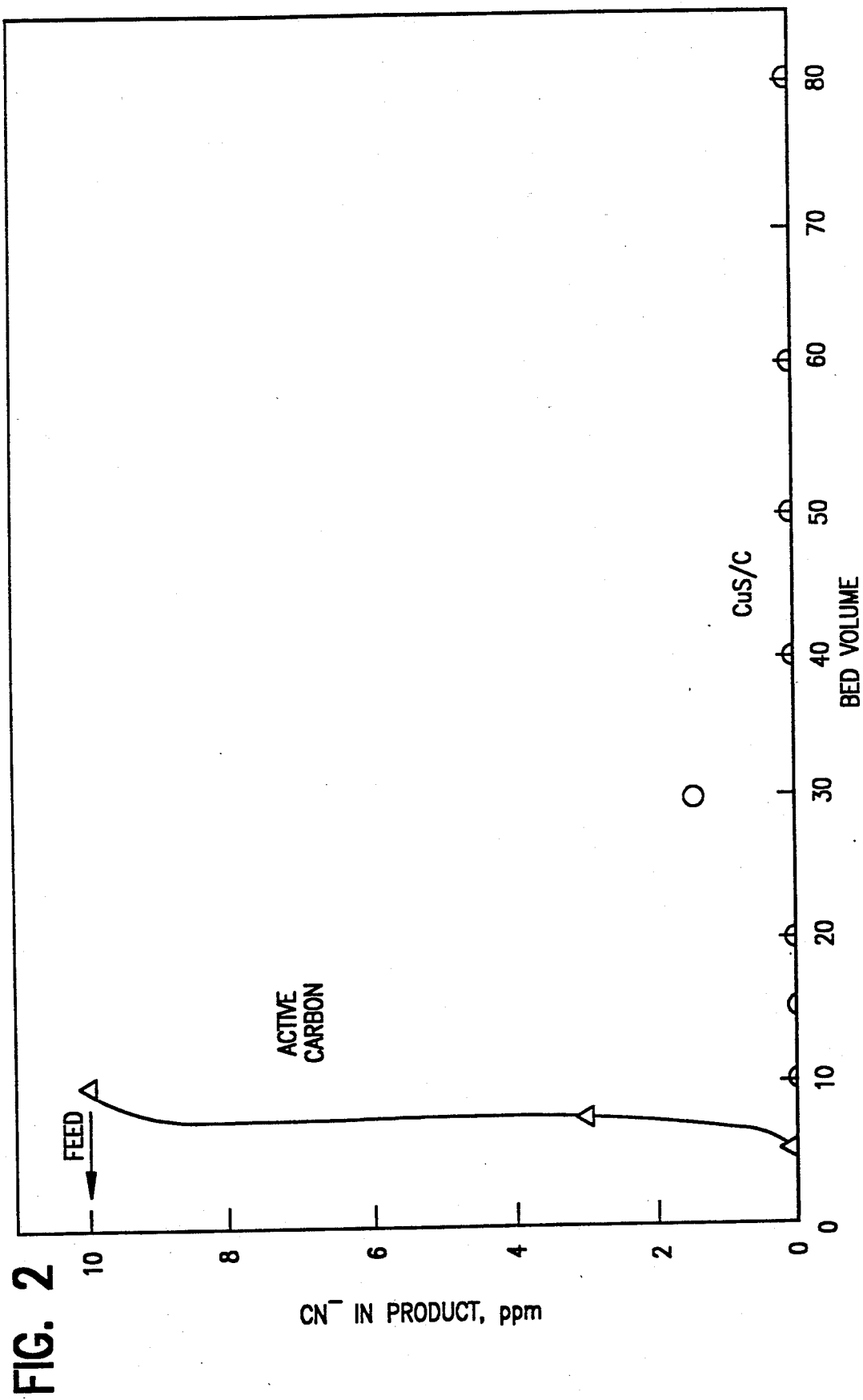
FIG. 2 is a graph of ppm $CN^-$ vs. Bed Volume representing the amount of $CN^-$ adsorbed in an adsorbent substrate.
Figure 3:
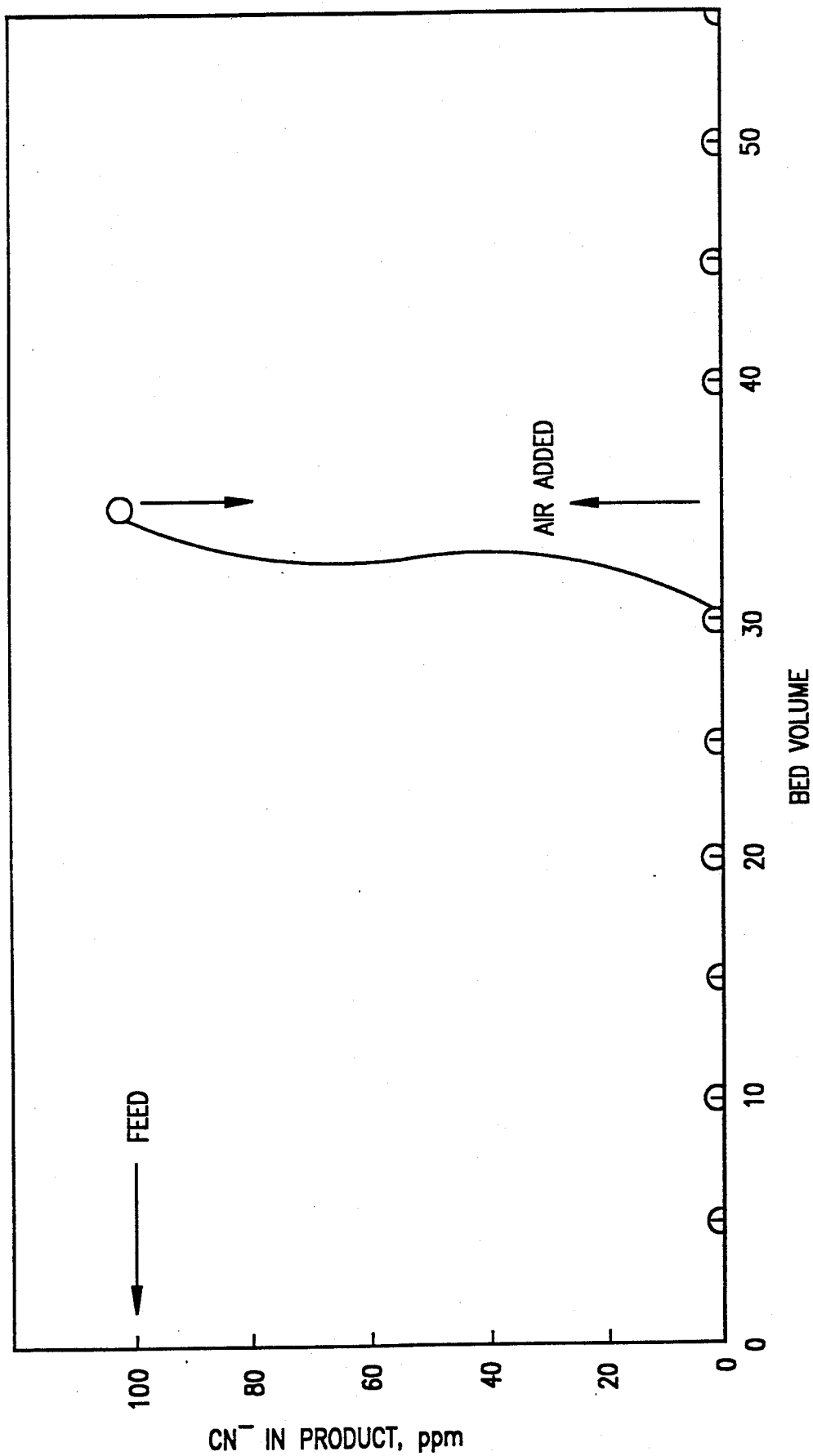
FIG. 3 is a graph of ppm $CN^-$ vs. Bed Volume representing the amount of $CN^-$ adsorbed in an adsorbent substrate treated with CuS.

Comparing the data collected from the tests and presented in FIGS. 2 and 3, it is apparent that a CuS treated activated carbon support is far superior in adsorbing the cyanide from the waste water than the active carbon itself. At 10 ppm cyanide concentration the cyanide breaks through the bed of activated carbon after only 7 bed volume. By contrast, at the same cyanide concentration, which is most commonly found in refinery effluent streams, treatment over a CuS treated activated carbon bed effectively removed cyanide from the waste water even after 80 bed volume. Due to the variability of experimental conditions in FIG. 2, about 0.75 ppm cyanide appears in the product at 30 bed volume; however, this promptly drops back to 0 by 40 bed volume and should not impact the efficacy of the process.

Referring to FIG. 3, at 100 ppm cyanide concentration the CuS treated substrate effectively removed cyanide from the water until cyanide breakthrough at treatment of about 35 bed volume. Air is fed cocurrent to the water. After regeneration with air the effluent is cyanide free by 40 bed volume. The effluent remains cyanide free after 135 bed volume (not shown in FIG. 3). This result indicates that the process can be conducted for extended periods of time without regeneration by cofeeding air with the waste water. This result also shows that the adsorbent can be regenerated on-line without shutting the unit down to feed air.

EXAMPLE 6

To assess the feasibility of long term use of the CuS treated adsorbent, the test water solution containing 10 ppm cyanide is passed downwards through the activated carbon bed treated with CuS. The solution is treated at 1 LHSV over the bed. The temperature is maintained at 110° C., pressure is maintained at 200 psi, oxygen flow is maintained at 20 cc/min. The adsorbent volume is 3.5 cc. The data collected are presented in Table 3. After 582 bed volume 0.1 ppm cyanide appears in the product indicating that the cyanide is breaking through. The LHSV is increased to 10 but this does not promote further cyanide breakthrough which indicates that the reaction of cyanide adsorption and reaction is rapid. The LHSV is reduced to 1 and at 731 bed volume 10 ppm (100%) cyanide breakthrough occurs; that is, the bed is completely exhausted. For reactivation of the exhausted bed to extend the bed life, 100 ppm of ammonia are added to the feed at 740 bed volume and at 761 bed volume no cyanide is detected in the effluent indicating that the spent adsorbent is reactivated by adding a small amount (100 ppm) of ammonia to the feed.

TABLE 3

| $NH_3$ Regeneration of the Water Insoluble Adsorbent | | | |
|---|---|---|---|
| Accumulated Bed Volume | (LHSV) | Cyanide in product (ppm) | Cyanide removal (%) |
| 214 | 1 | 0 | 100 |
| 238 | 1 | 0 | 100 |
| 262 | 1 | 0 | 100 |
| 369 | 1 | 0 | 100 |
| 433 | 1 | 0 | 100 |
| 498 | 1 | 0 | 100 |
| 582 | 1 | 0.1 | 99 |
| 666 | 10 | 0.1 | 99 |
| 731 | 1 | 10.0 | 0 |
| 735 | 1 | 10.0 | 0 |
| Add 100 ppm $NH_3$ to the feed | | | |
| 761 | 1 | 0 | 100 |
| 779 | 1 | 0 | 100 |

I claim:
1. A method of removing cyanides from a cyanide-containing waste water comprising the steps of:
   (a) feeding said cyanide-containing waste water into a reaction zone containing a porous solid substrate having a water insoluble metal compound deposited thereon;
   (b) contacting said waste water with said substrate which adsorbs the cyanide from said waste water; and
   (c) discharging the waste water from the reaction zone whereby said waste water is substantially free of said cyanide.
2. The method as described in claim 1 in which the metal compound contains Cu, Fe, Ni, Ag, Au, Mo, Co or Zn.
3. The method as described in claim 2 in which the water insoluble metal compound is a sulfide.
4. The method as described in claim 3 in which the water insoluble metal compound is CuS, $Cu_2S$, AgS, ZnS, $MoS_2$, CoS, NiS or FeS.
5. The method as described in claim 2 in which the porous solid substrate is activated carbon, $Al_2O_3$, $SiO_2$, $SiO_2/Al_2O_3$ or a zeolite.
6. The method as described in claim 2 in which the water insoluble metal compound is $Cu_2O$, $Au_2O_3$, ZnO, $Fe_2O_3$, CuO, $Co_2O_3$, NiO or FeO.

7. The method as described in claim 1 in which the cyanide-containing waste water is fed to said reaction zone at a rate of 0.01 to 100 LHSV.

8. A method of removing cyanide from a cyanide-containing waste water comprising the steps of:
   (a) passing said cyanide containing waste water through a reaction zone containing a porous solid substrate having a water insoluble metal compound deposited thereon, whereby said cyanide is removed from the water by adsorption onto said substrate;
   (b) supplying a source of oxygen to the reaction zone;
   (c) catalytically oxidizing said adsorbed cyanide; and
   (d) discharging the treated water from the reaction zone, the treated water being, substantially cyanide free.

9. The method as described in claim 8 in which the porous solid substrate is activated carbon.

10. The method as described in claim 9 in which the water insoluble metal compound contains Cu, Fe, Ni, Ag, Au, Mo, Co or Zn.

11. The method as described in claim 10 in which the water insoluble metal compound is a sulfide.

12. The method as described in claim 11 in which the water insoluble metal sulfide compound is deposited on the porous solid substrate by impregnating the substrate with an aqueous copper nitrate solution; drying the substrate to decompose the copper nitrate to form cupric oxide; and sulfiding the cupric oxide of the substrate by contacting the substrate with a source of sulfur until the sulfur content is at least 80% of the stoichiometric amount of the cupric oxide.

13. The method as described in claim 8 in which the method further comprises reducing the chemical oxygen demand or the water by oxidizing the oxidizable components of the water.

14. The method as described in claim 8 in which the source of oxygen is air.

15. The method as described in claim 8 in which the process includes the step of reactivating the substrate by feeding ammonia to the reaction zone.

16. A method of removing cyanide from cyanide-containing waste water comprising the steps of:
   (a) passing said cyanide-containing waste water into a reaction zone containing a porous solid activated carbon substrate, said substrate having a water insoluble metal sulfide or oxide compound deposited thereon, whereby said substrate adsorbs said cyanide;
   (b) discharging the treated waste water from the reaction zone whereby said treated waste water is substantially free of said cyanide.

17. The method as described in claim 16 which comprises supplying a source of oxygen to the reaction zone to oxidize the adsorbed cyanide.

18. The method as described in claim 17 which includes the step of adding ammonia to said reaction zone to reactivate the treated substrate.

19. The method as described in claim 16 in which the porous activated carbon substrate contains 1 to 30 wt. % water insoluble sulfided copper compound.

20. The method as described in claim 16 in which the metal sulfide is CuS.

* * * * *